G. E. AARNO.
REVERSING MECHANISM.
APPLICATION FILED MAR. 2, 1916.
1,208,438.
Patented Dec. 12, 1916.
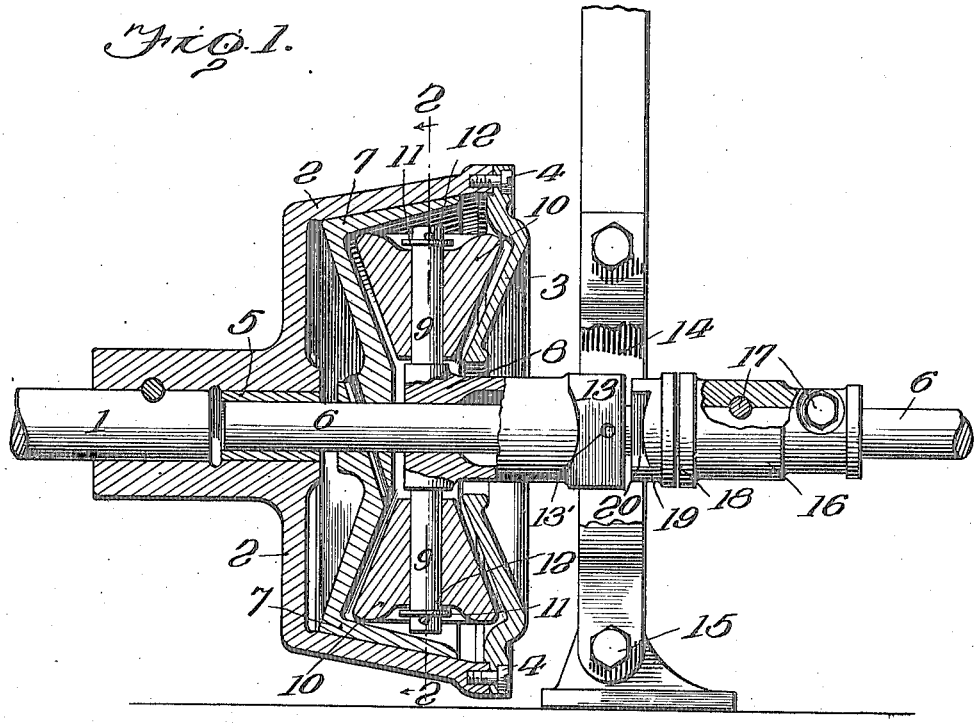
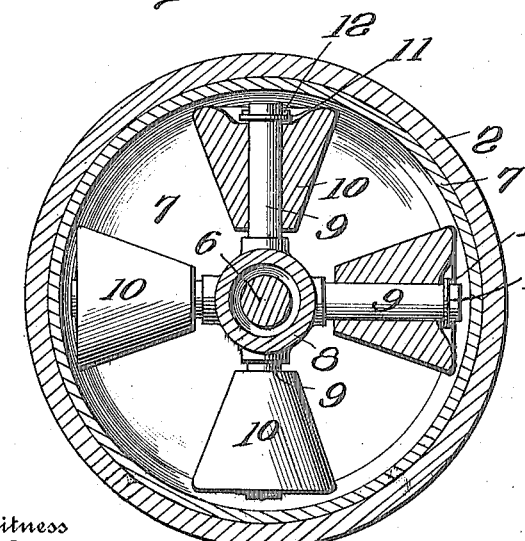
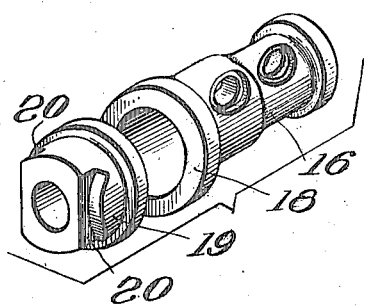
Witness
Floyd R. Cornwall.
Frank H. Borden.
Inventor
George E. Aarno
By Louis Bagger & Co
his Attorneys

UNITED STATES PATENT OFFICE.

GEORGE E. AARNO, OF SPRINGFIELD, MASSACHUSETTS.

REVERSING MECHANISM.

1,208,438.

Specification of Letters Patent.

Patented Dec. 12, 1916.

Application filed March 2, 1916. Serial No. 81,708.

*To all whom it may concern:*

Be it known that I, GEORGE E. AARNO, a citizen of the United States, residing at Springfield, in the county of Hampden and State of Massachusetts, have invented certain new and useful Improvements in Reversing Mechanisms, of which the following is a specification.

My invention relates to an improvement in reversing mechanisms, and is intended to be applied to the reversing of a motor boat.

The objects of my invention are to provide a device wherein a stationary set of rollers are pushed in one direction and are forced against a clutch member for turning the propeller in the same direction as the propelling means, and when pushed back forms the driving connection between the two oppositely rotating members whereby the propeller is reversed in its direction of rotation.

In the accompanying drawings, Figure 1 is a vertical section showing the internal mechanism of my clutch with some of the parts shown in full lines; Fig. 2 is a transverse section on the line 2—2 of Fig. 1, some of the rollers being shown in elevation; and Fig. 3 is a separated perspective view of the collar and adjustable sleeve.

To a power shaft 1 is keyed the housing 2, which in turn carries the plate 3 through the screws 4. On the internal bore of the housing 2 is provided a bushing 5, slidably received in this bushing 5 is a driven shaft 6, which is connected to the propeller of the boat. Keyed to this shaft 6 is a cone clutch 7.

It will be noted that the external face of the cone clutch 7 and the internal face of the housing 2 are parallel, so that longitudinal movement of the shaft 6 will result in an impinging of the cone clutch 7 against the housing 2, whereby they are rotated together. This impinging action is provided for by the hollow sleeve 8 mounted upon the shaft 6.

The sleeve 8 has rigidly affixed to one end the spindles 9, carrying the rollers 10. The rollers 10 are made of or faced with some frictional material such as leather, and are adapted to be centered in the space between the cone clutch 7 and the plate 3, as shown in Fig. 1. These spindles 9, are provided at the ends with retaining means, such as the washer 11 and key 12. The other end of the sleeve 8 is provided with two flat surfaces 13, 13, which are embraced by a lever 14, which is pivoted at 15.

It will be seen that with the mechanism described so far, upon the movement of the lever 14 forward, that is, toward the clutch, the sleeve 8 will slide along the shaft 6, and the rollers 10 will bear against the internal surface of the cone clutch 7, and upon further movement in the same direction the cone clutch 7 will impinge against the housing 2, as previously noted, with the result that the shaft 6 will be rotated in the same direction as the power shaft 1.

To the driven shaft 6 is adjustably affixed the sleeve 16, rendered adjustable longitudinally of the shaft 6, by means of set screws 17, 17. This sleeve 16 is provided with a shoulder 18.

Loosely mounted on the driven shaft 6 is a collar 19, provided with parallel faces 20, 20 and adapted to be embraced by the lever 14, in the same manner as sleeve 8.

When the boat is to be stopped suddenly, the propeller reversing lever 14 is actuated in the opposite direction, which will result in forcing the collar 19 against the shoulder 18 of the sleeve 16, thus sliding the shaft 6 in the bushing 5 and carrying with it the cone clutch 7. Upon a continued movement of the lever 14, the cone clutch 7 will engage the rollers 10, and will then force them against the internal surface of the face plate 3. The result is that the plate 3, revolving with the motor, and the sleeve 8 being incapable of rotation, the rollers 10 can but rotate about their spindles 9, consequently the cone clutch 7 will be rotated in an opposite direction from that of the power shaft 1, which will result in an immediate reversal of the propeller.

In a motor boat the propeller end of the shaft 6 is lower than the power end of the shaft 1, and there will be a consequent tendency on the part of the lever 14 to incline toward the rear, thus pressing lightly against the collar 19, and through the sleeve 16 and shaft 6, so as to ordinarily keep the cone clutch 7 out of engagement with the housing 2, and also to keep the rollers 10 at an equal distance between the cone clutch 7 and face plate 3.

I claim:

1. The combination with a power shaft, of a housing and a face plate connected therewith affixed to said power shaft, a clutch facing on said housing, a driven shaft carrying clutching means, a sleeve longitudinally movable on said driven shaft, intermediate rotary means carried by said sleeve, and means for moving said rotary means carrying sleeve whereby the clutching means will be actuated by the clutch facing on said housing, and upon a reversal of the movement of the actuating means the clutching means will bear against said intermediate rotary means, and the intermediate rotary means will bear against said face plate whereby to reverse the direction of the rotation of the driven shaft.

2. The combination with a power shaft, of a housing and a face plate connected therewith keyed to said shaft, a clutch facing on said housing, a driven shaft, clutching means mounted thereon, intermediate rotary means located between said clutching means and said face plate, a slidable collar on said driven shaft, a sleeve adjustably mounted on said driven shaft in close proximity to said collar, means for actuating said collar whereby it may be brought into engagement with the sleeve on said driven shaft whereby a driven shaft is moved axially and said intermediate rotary means is squeezed between the clutching means and said face plate and the direction of the driven shaft is reversed.

3. The combination with a shaft, of a unitary element having clutch and gear portions thereon, a driven shaft, a unitary element having clutch and gear portions thereon connected with said driven shaft, a non rotatable slidable sleeve having journal pins, pinions on the pins between the gear portions of said elements, means comprising a lever engaging said sleeve, a collar slidably mounted on said driven shaft and engaged by said lever, and a sleeve adjustably mounted on the driven shaft for sliding the sildable shaft to engage the clutch portions or the gear portions and pinions.

In testimony whereof I affix my signature.

GEORGE E. AARNO.

Copies of this patent may be obtained for five cents each, by addressing the "Commissioner of Patents, Washington, D. C."